UNITED STATES PATENT OFFICE.

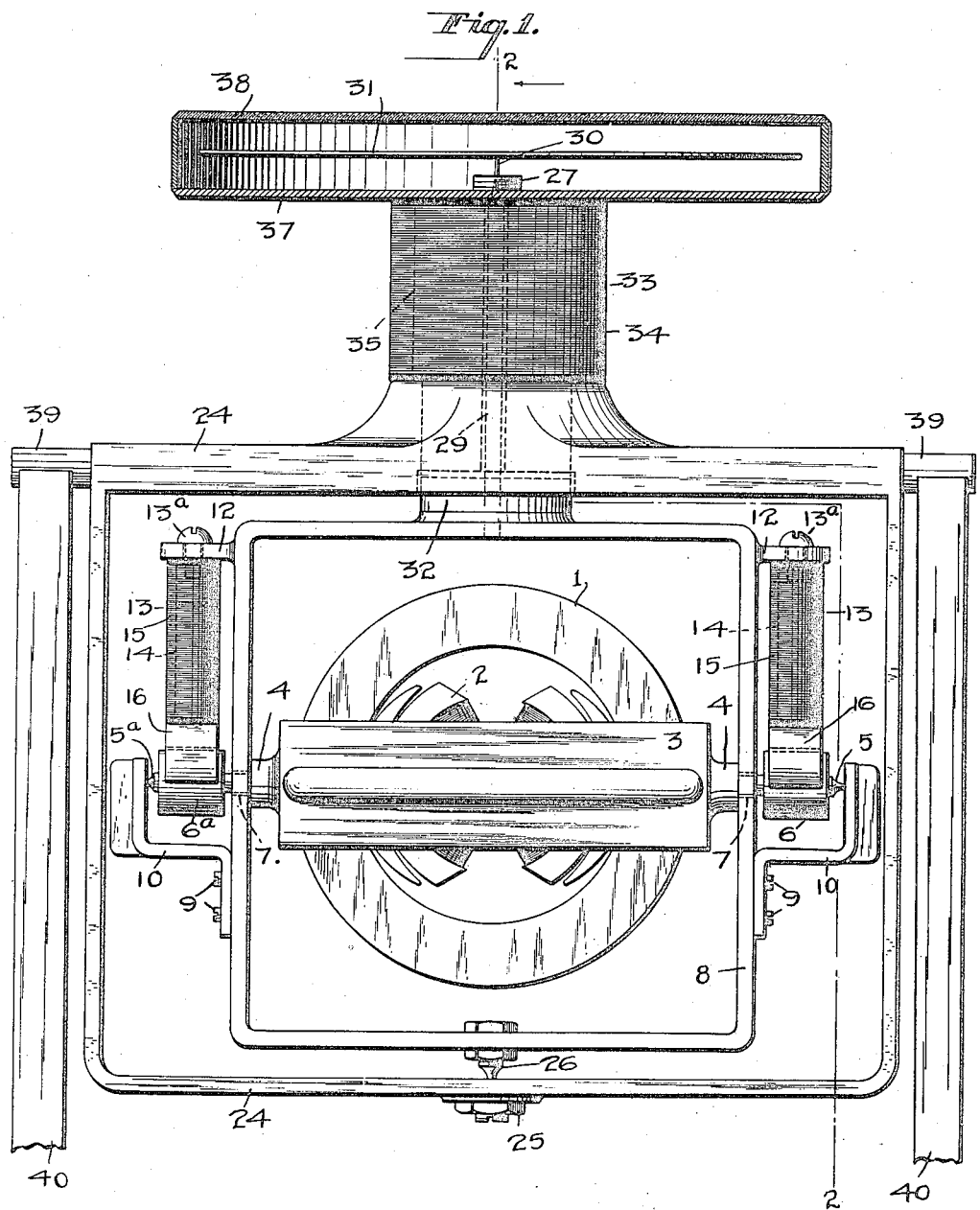

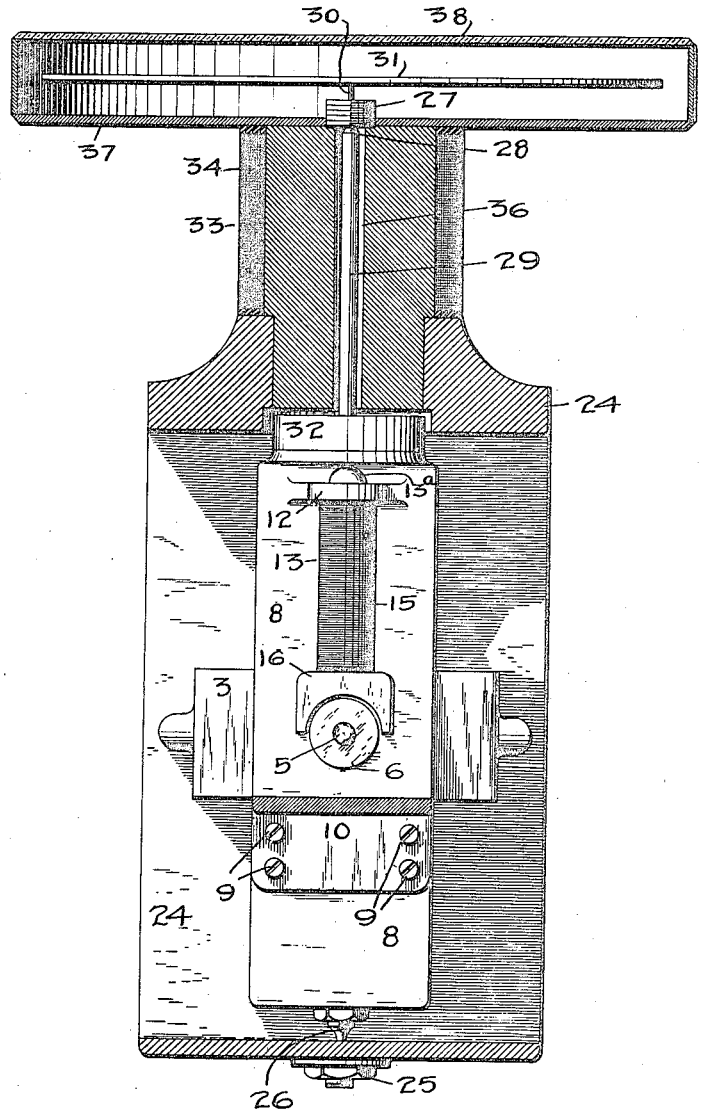

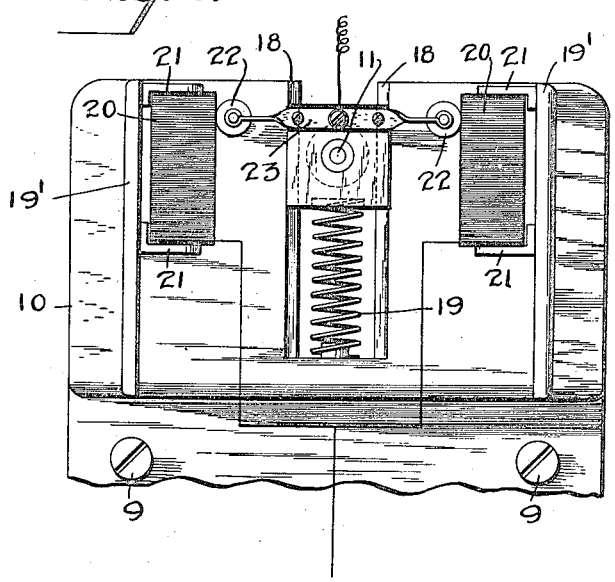
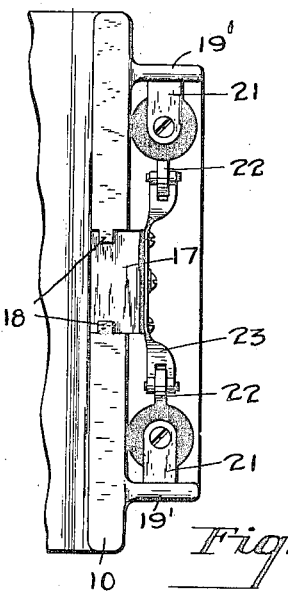
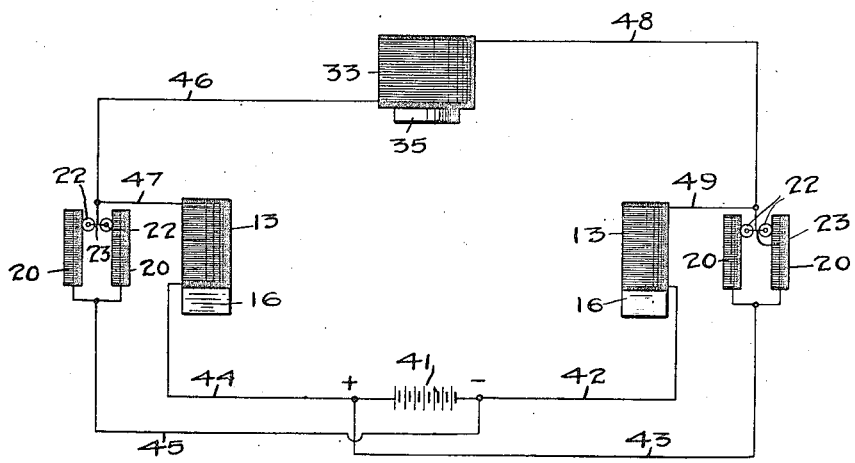

GEORGE A. ROSSITER AND EDWARD A. THORNE, OF BROOKLYN, NEW YORK, ASSIGNORS TO FRANK G. CARRIE, OF NEW YORK, N. Y.

BEARING FOR GYROSCOPIC APPARATUS.

1,213,692.

Specification of Letters Patent.  Patented Jan. 23, 1917.

Application filed May 6, 1912. Serial No. 695,514.

*To all whom it may concern:*

Be it known that we, GEORGE A. ROSSITER, a citizen of the United States, and EDWARD A. THORNE, a subject of the King of Great Britain and Ireland, and both residing in the city of Brooklyn, county of Kings, State of New York, have invented a new and useful Bearing for Gyroscopic Apparatus, of which the following is a specification.

Our invention relates to a structure as used in a gyroscopic compass or meridian finder in which a gyroscopic disk, mounted in frames oppositely pivoted in one another to permit freedom of movement in any direction, is employed.

It is obvious that where great friction in the supporting bearings exists, it is difficult to obtain an accurate reading, as from the nature of gyroscopes the mass must be great, and the disk must revolve at a high speed to secure the desired result.

In the form shown herewith, the gyroscopic disk is supported in frames and mounted above the center of gravity, and it will therefore, maintain a perfect plane of rotation, and if it is perfectly balanced and has freedom of movement in all directions with its plane of revolution east and west, it will adjust itself to the plane of least resistance.

As shown, we mount the gyroscopic disk in a disk holding frame provided with bearings to receive the shaft or pivots of the disk. The disk holding frame is provided with pivots in a horizontal plane and is free to move in a vertical plane or about a horizontal axis in another frame, which is free to move in a horizontal direction or about a vertical axis.

Our invention is further described in the following specification, and one embodiment thereof is illustrated in the drawings herewith in which, Figure 1 is an elevation of a gyroscopic compass provided with our friction reducing apparatus. Fig. 2 is a sectional view on the line 2—2 of Fig. 1. Fig. 3 is an enlarged detail view of the pivots and their compensating device. Fig. 4 is a plan view of the same. Fig. 5 is a diagrammatic view showing a method of electrical compensation.

Referring to the drawings, 1 is the usual form of gyroscopic disk, rotated by a motor 2, the electrical connections for supplying the current not being shown. The gyroscopic disk is mounted in a frame 3, having hubs 4, in which are secured the pivots 5 and 5ª. Mounted on the said pivots and secured thereto are cylindrical armatures 6 and 6ª of some high magnetic metal. The pivots 5 and 5ª of the frame 3 pass through openings 7 in a frame 8 of non-magnetic metal, the openings 7 being larger than the pivots 5 and 5ª.

Secured to the frame 8 by means of screws 9, are the brackets 10, in which are mounted the pivot blocks 11, as shown in Fig. 3. For the purpose of electric insulation the said pivot blocks 11 can be made of agate or other non-conducting material.

The frame 8 is provided with ears 12, to which are secured by means of the screws 13ª, the electromagnets 13, comprising cores 14 and windings 15, the cores 14 terminating in saddle pieces 16. It is obvious that if the electromagnets are connected with a source of electrical energy, the armature pieces 6 and 6ª will be attracted by the energized saddle pieces 16, and if the strength of the current flowing through the coils 15 is nicely adjusted, the attraction of the saddle pieces 16 for the armatures 6 and 6ª can be made to exactly balance the combined weight of the disk 1 with its motor 2, the frame 3, the armatures 6 and 6ª and the pivots 5 and 5ª, without the armatures 6 and 6ª coming into contact with the saddle pieces 16.

As the frame 3 with its pivots and disk would be in a state of suspension, the only function of the pivots 5 and 5ª would be that of positioning and they could, therefore, be made very light and sensitive.

In actual practice we have found it advisable to regulate the current to make the attraction of the magnets 13 for the armatures 6 and 6ª, balance all of the weight as set forth above with the exception of about one-half ounce, which would be taken up by the two pivots 5 and 5ª and their respective pivot blocks 11 and 11ª.

To provide against the contingency of a sudden shock, which might bend out of shape the lightly constructed pivots 5 and 5ª, and render the whole apparatus useless, we mount the pivot blocks 11 in carrying blocks 17, slidably mounted in ways 18 of the brackets 10 and springs 19 of such resistance to compression, that the sum of their resistance is about equal to the difference between the weight borne by the magnetic means and the total weight of the parts.

On ribs 19' of the brackets 10, we mount resistance coils 20 by means of the pieces 21, the carrying blocks 17 having rolls 22 supported by a spring plate 23 secured thereto and insulated therefrom. If the apparatus should receive a sudden shock, the magnets 13 being connected to a source of electrical energy through the resistance coils 20, the carrying blocks 17 would cushion on the springs 19, the contact rolls 22 would roll along the coils 20, cutting out some of the resistance between the source of energy and the electromagnets and thereby the electromagnets 13 would receive a greater current and would thus create a magnetic field with a greater number of magnetic lines, in consequence of which, the armatures 6 and 6ª would be attracted to the saddle pieces 16 to a greater extent and would automatically compensate and balance the effect of the shock. It is obvious that this compensation can be accomplished in a number of ways, and we show here only one of the preferred forms.

The frame 8 is mounted in a secondary frame 24 of non-magnetic metal, with a similar anti-friction bearing as described above. The frame 24 is positioned by the bottom thrust bearing 25 and a pivot 26 on the frame 8, and the upper guide bearing 27 and the pivot 28 formed on the rod 29 secured to the frame 8. The pivot 28 is turned down to form the teat 30 which carries the usual reading plate 31, inclosed in a casing 37 with a transparent top 38.

The armature 32 is mounted and securely fastened to the upper side of the frame 8, in the magnetic field of the electromagnet 33, which is composed of the windings 34 and the core 35 with an axial opening 36 extending therethrough, the diameter of this opening being slightly greater than the diameter of the rod 29. The entire unit is carried in the usual manner on knife edges 39 formed on the frame 24 and resting in brackets of a support partially shown at 40.

In Fig. 5, we show diagrammatically the method of electric compensation, and the connections. Similar parts in this figure and the other figures are indicated by the same characters.

A source of energy is shown at 41, the lead 42 connecting one end of the winding of the magnet 13 with the positive of the source of electrical energy and the lead 43 connecting the negative of the source of energy with the resistance coils 20, the latter being connected to the lead 43 in multiple. In a like manner the leads 44 and 45 perform a similar function.

If for any reason whatever, the pivot 5 should be deflected from its position, the compensation on that pivot will take place independently. This also applies to the compensation on the pivot 5ª and in addition, to any tendency to deflect both pivots simultaneously. To evolve a compensation in the magnetic field created by the magnet 33, a lead 46 is taken from the connection 47 and similarly a lead 48 is taken from the connection 49. If the sum of the resistances of the magnetic coil 33 and the four resistance coils 20, are equal to the sum of the resistances of the coils 13, a condition of electrical equilibrium and compensation is established.

We do not wish to limit ourselves to attraction magnets only, as it is obvious that repulsion or permanent magnets could be used to obtain the same result.

We claim:

1. In a gyroscopic compass the combination of a bearing; a yielding member supporting said bearing; magnetic means adapted to lessen the weight of said bearing on its support; and automatic means associated with said yielding member adapted to control the action of said magnetic means, substantially as described.

2. In a gyroscopic compass the combination of a gyroscopic disk; a frame provided with armatures and bearings for supporting said disk; a second frame provided with yielding members on which said bearings are pivoted; magnets supported by said second frame adapted to attract said armatures and thereby reduce the friction of said bearings; resistances under the control of said yielding members; a circuit through said resistances and said magnets and means for supporting said second frame, substantially as described.

In witness whereof, we have hereunto set our hands this 24th day of April, 1912.

GEORGE A. ROSSITER.
EDWARD A. THORNE.

Witnesses:
J. W. MANNEBACH,
WILLARD G. STANTON.